（12） United States Patent
Siraj et al.

(10) Patent No.: US 10,271,215 B1
(45) Date of Patent: Apr. 23, 2019

(54) MANAGEMENT FRAME ENCRYPTION AND DECRYPTION

(71) Applicant: Hewlett Packard Enterprise Development LP, Houston, TX (US)

(72) Inventors: Mohd Shahnawaz Siraj, San Jose, CA (US); Aidan Doyle, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/019,806

(22) Filed: Jun. 27, 2018

(51) Int. Cl.
| | | |
|---|---|---|
| *H04W 12/04* | (2009.01) |
| *H04W 12/08* | (2009.01) |
| *H04W 48/16* | (2009.01) |
| *H04W 48/20* | (2009.01) |
| *H04W 76/12* | (2018.01) |
| *H04W 84/12* | (2009.01) |
| *H04W 88/08* | (2009.01) |

(52) U.S. Cl.
CPC ........... *H04W 12/08* (2013.01); *H04W 12/04* (2013.01); *H04W 48/16* (2013.01); *H04W 48/20* (2013.01); *H04W 76/12* (2018.02); *H04W 84/12* (2013.01); *H04W 88/08* (2013.01)

(58) Field of Classification Search
CPC ..... H04W 12/08; H04W 76/12; H04W 12/04; H04W 48/20; H04W 48/16; H04W 88/08; H04W 84/12
See application file for complete search history.

(56) References Cited

U.S. PATENT DOCUMENTS

| 7,519,184 | B2 | 4/2009 | Kayashima et al. | |
| 7,805,603 | B2 | 9/2010 | Qi et al. | |
| 8,595,481 | B1* | 11/2013 | Gentry, Jr. ............ | H04W 12/06 713/153 |
| 8,767,758 | B2 | 7/2014 | Sood | |
| 9,197,415 | B2 | 11/2015 | Kim et al. | |
| 2005/0086465 | A1 | 4/2005 | Sapkota et al. | |
| 2005/0207581 | A1* | 9/2005 | Qi ........................ | H04W 12/02 380/270 |
| 2008/0072047 | A1* | 3/2008 | Sarikaya .................. | H04L 9/32 713/171 |
| 2011/0103232 | A1* | 5/2011 | Sood ....................... | H04L 63/20 370/241 |
| 2014/0050167 | A1 | 2/2014 | Smedman et al. | |
| 2015/0256453 | A1* | 9/2015 | Laraqui .................. | H04L 45/74 370/392 |
| 2016/0029215 | A1* | 1/2016 | Jung ...................... | H04W 12/06 713/168 |

(Continued)

FOREIGN PATENT DOCUMENTS

CN          101646171          2/2010

OTHER PUBLICATIONS

Summit WM3000 Series Controller System Reference Guide, Software Version 4.3, (Web Page), Feb. 2011, 39 Pgs.

(Continued)

*Primary Examiner* — Brandon J Miller
(74) *Attorney, Agent, or Firm* — Brooks, Cameron & Huebsch, PLLC

(57) ABSTRACT

An example access controller (AC) can receive an encrypted management frame from an access point (AP) associated with the AC, decrypt the encrypted management frame, and send the decrypted management frame to the AP.

19 Claims, 6 Drawing Sheets

(56) References Cited

U.S. PATENT DOCUMENTS

2016/0143069 A1* 5/2016 Xie ..................... H04W 12/04
370/329

OTHER PUBLICATIONS

Yang, L., Architecture Taxonomy for Control and Provisioning of Wireless Access Points (CAPWAP), (Web Page), Jun. 2005, 41 Pgs.
Cisco Secure Services Client Administrator Guide, Release 5.1, (Web Page), Retrieved Jun. 6, 2018, 22 Pgs.
Configuring Management Frame Protection, (Research Paper), Retrieved Jun. 6, 2018, 6 Pgs.
Patil, J., Get Your Wi-fi Network Ready for Windows 8, (Web Page), Oct. 12, 2012, 11 Pgs.

* cited by examiner

MANAGEMENT FRAME ENCRYPTION AND DECRYPTION

BACKGROUND

Frames such as management frames can be used to manage and control wireless links. For example, management frames enable stations (STAs) to establish and maintain communications and support authentication, association, and synchronization.

DETAILED DESCRIPTION

Figure 1:
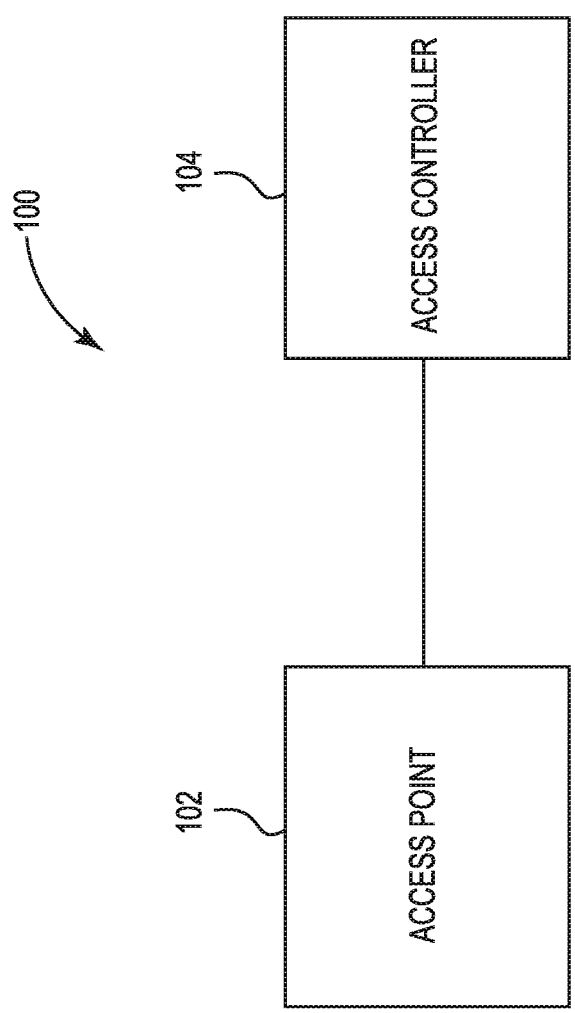
FIG. 1 is an example system for management frame encryption and decryption including an access point (AP) and an access controller (AC) consistent with the present disclosure.

Wireless security protocols have been developed to protect wireless networks. Example wireless security protocols include wired-equivalent privacy (WEP), Wi-Fi Protected Access (WPA), WPA version 2 (WPA2), and WPA version 3 (WPA3), among others. The protocols can aid in preventing uninvited guests from connecting to a wireless network and can encrypt private data as it is being transmitted over airwaves.

For instance, example protocols can include the use of protected management frames (PMFs) such as deauthorization frames, disassociation frames, and specified action frames such as add block acknowledgement (ADDBA). The use of PMFs includes encrypting specified unicast management frames with the same pairwise transient key (PTK) used for data and using an Integrity Group Temporal Key (IGTK) to protect specified broadcast frames. In some example protocols, PMFs are used for opportunistic wireless encryption (OWE), personal modes of operation, and enterprise modes of operation. PMFs allow for protection of unicast and multicast management frames. For instance, unicast management action frames may be protected from both eavesdropping and forging, and multicast management action frames may be protected from forging.

Some management frames (e.g., ADDBA request management frames) are sent from an AP's wireless firmware component. These frames cannot be sent from an AC because STA state information used to generate these management frames is coupled with the AP's wireless firmware. To comply with PMF standards, these management frames are encrypted. However, in some AP architectures, tunnel forwarding mode is used, meaning encryption keys are not stored in the AP, and the AP cannot encrypt these management frames.

Similarly, when receiving such management frames from the STA, the AP does not have the security keys to decrypt the management frames. An STA, as used herein, is a device that has the capability to use the 802.11 protocol. For example, a STA may be a laptop, a desktop personal computer, personal digital assistant, AP or Wi-Fi phone, among others. An STA may be fixed, mobile, or portable. An AC may have the security keys to decrypt the frames but may not parse contents of the management frames because the AC does not have state information about the STA.

Some approaches to using tunneling mode in compliance with the aforementioned example protocols include storing the encryption keys in the AP and using them to encrypt and decrypt management frames on the AP itself. However, this can expose security holes, for instance, if the AP is hacked allowed access to encryption keys in the AP. Further, some approaches partition Wireless Local Area Network (WLAN) protocol functions between an AC and an AP, but this does not address management frames generated and processed on the AP.

Examples of the present disclosure can allow for encryption and/or decryption of management frames in an architecture (e.g., "centralized crypto architecture) that utilizes tunnel forwarding mode to keep encryption keys (e.g., PTK, IGTK, etc.) on the AC. For instance, management frames generated and processed on the AP are not terminated at the AC, and data is encrypted end-to-end from STA (e.g., a client device) to core (e.g., the AC) resulting in enhanced security as compared to other approaches. Put another way, examples of the present disclosure allow for encryption keys to stay at the AC (e.g., the encryption keys are not sent to the AP), with encryption and decryption of management frames happening at the AC. Keeping encryption keys on the AC can prevent a malicious actor with access to the network from obtaining the encryption key while in transit and disrupting management actions using the encryption key.

FIG. 1 is an example system 100 for management frame encryption and decryption including an AP 102 and an AC 104 consistent with the present disclosure. APs, such as AP 102 may be used to provide devices access to a network. As used herein, an AP can refer to a networking device that allows a client device to connect to a wired or wireless network. As used herein, AP can, for example, refer to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communication standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory. The network may be a wireless network, for example, a WLAN. As used herein, WLAN can, for example, refer to a communications network that links two or more devices using some wireless distribution method (for example, spread-spectrum or orthogonal frequency-division multiplexing radio), and usually providing a connection through an AP to the Internet;

and thus, providing users with the mobility to move around within a local coverage area and still stay connected to the network.

AP 102 can be associated with AC 104, in some examples. As used herein "associated with" can include coupled via various wired and/or wireless connections between devices such that data can be transferred in various directions between the devices. The association need not be a direct connection, and in some examples, can be an indirect connection. As used herein, an AC may generally refer to a network device offering centralized network engineering, Internet Protocol services, security and policy controls, and application-aware platforms. In addition to network control, the AC can be also deployed as branch gateways, virtual private network (VPN) concentrators, wireless intrusion prevention system (WIPS) or wireless intrusion detection system (WIDS), spectrum monitors, stateful network firewalls with integrated content filtering, etc. The AC can manage a plurality of APs and/or client devices associated with the APs in the WLAN. In some examples, AC 104 may be a network controller. As used herein, a network controller refers to a management device on a computer network. For example, a network controller may manage APs within a WLAN. The terms "network controller" and "AC" are used interchangeably throughout the disclosure.

AP 102 can perform management frame processing operations, and AC 104 can perform management frame encryption and decryption operations. For instance, when a management frame is to be transmitted from AP 102, the management frame is generated based on the state of an associated STA (not illustrated in FIG. 1). In response to the generation, the management frame can be encrypted. Similarly, when the management frame is received at AP 102, the frame can be decrypted, and a state of the STA can be stored. Some examples of the present disclosure allow for the management frame processing operations to be performed on AP 102, and the encryption and decryption operations can be performed on AC 104.

For instance, management frame processing operations can include AP 102 storing state information associated with a management frame responsive to receiving a decrypted response management frame from AC 104. Management frame processing operations can include, in some examples, AP 102 generating the management frame based on state information associated with an STA associated with AP 102 and/or storing state information of the STA. Management frame and STA state information can include, for instance, block acknowledgement state information, starting sequence numbers, terminal identification numbers, and aggregated media access control (MAC) service data unit (AMSDU) information (e.g., enabled or disabled), among others. Decryption and encryption operations, for instance, can include AC 104 storing an encryption key for encryption and decryption of management frames.

System 100, in some examples, can utilize a tunnel forwarding mode to transport a management frame between AP 102 and AC 104. Tunnel forwarding mode refers to how management frames are encapsulated and sent between AP 102 and AC 104. For instance, tunnel forwarding mode can include, in a downstream direction (e.g., AC 104 to AP 102), an Ethernet frame converted to an 802.11 frame by an AC datapath module. An AC datapath module, as used herein, is a software module inside an AC (e.g., AC 104) responsible for processing management frames including encapsulation (e.g., converting 802.3 management frames to 802.11 management frames) and decapsulation (e.g., converting 802.11 management frames to 802.3 management frames), along with encryption and decryption.

If encryption is enabled, the 802.11 frame is also encrypted by the AC datapath module. The resulting 802.11 management frame is encapsulated in a generic routing encapsulation (GRE) packet and sent to the AP. The AP datapath module receives the GRE packet and extracts the 802.11 management frame. A wireless driver takes the 802.11 management frame and puts it out on the air at an appropriate time.

Tunnel forwarding mode in an upstream direction (e.g., AP 102 to AC 104) can include an AP receiving an 802.11 management frame from an STA (e.g., client). A WLAN chip does not decrypt the frame because a clear key entry is programmed in the WLAN chip for a client MAC address. The 802.11 management frame is passed as is to the wireless driver. The wireless driver delivers the received management frame to the AP datapath module. The AP datapath module prepends a GRE and internet protocol (IP) header and sends the encapsulated packet to the AC. The datapath on the AC decrypts the frame and converts it back into 802.3 format. Tunneling forwarding mode can, for example, allow for data encrypted end-to-end from STA (e.g., client) to core (e.g., AC) resulting in enhanced security of the system (e.g., system 100).

In some examples, AP 102 receives an encrypted management frame from an STA and returns an encrypted management frame in response. For instance, system 100 can include AP 102 to receive an encrypted management frame from the STA associated with AP 102 and send a response management frame to the STA in response to decryption of the encrypted management frame and encryption of the response management frame by AC 104. As used herein, a response management frame includes a management frame sent in response to a request for a particular management frame. Put another way, AC 104 can receive an encrypted management frame from AP 102, decrypt the encrypted management frame, and send the decrypted management frame (e.g., via tunnel forwarding mode) to AP 102, where management frame processing can occur. The encrypted management frame can be received by AC 104 responsive to AP 102 receiving the encrypted management frame from the associated STA in some instances.

Upon processing by AP 102, in some examples, AC 104 can receive an unencrypted response management frame from AP 102, encrypt the unencrypted response management frame, and send the encrypted response management frame (e.g., via tunnel forwarding mode) to AP 102. From there, AP 102 can send the encrypted response management frame to an associated STA. In some instances, AC 104 can store an encryption key for decryption of the encrypted management frame and/or encryption of the unencrypted response management frame.

In some examples, AP 102 sends an encrypted management frame to an STA and receives an encrypted management frame in response. For instance, system 100 can include AP 102 to generate an encrypted management frame, send the encrypted management frame to an STA associated with the AP, and receive an encrypted response management frame from the STA in response.

In some examples, an encrypted management frame and/or an encrypted response management frame can include a protected management frame. As noted above, a protected management frame can be encrypted with particular encryption keys for particular functions. AP 102, in some instances, can store a pre-encrypted management frame. In such an example, a pre-encrypted management frame can be constructed and saved at AP 102 for later use. For instance, sending a management frame to AC 104 for encryption can be avoided such that latency is paid for upfront by pre-encrypting, so the management frame can be sent by AP 102 without taking the time to send to AC 104.

Figure 2:
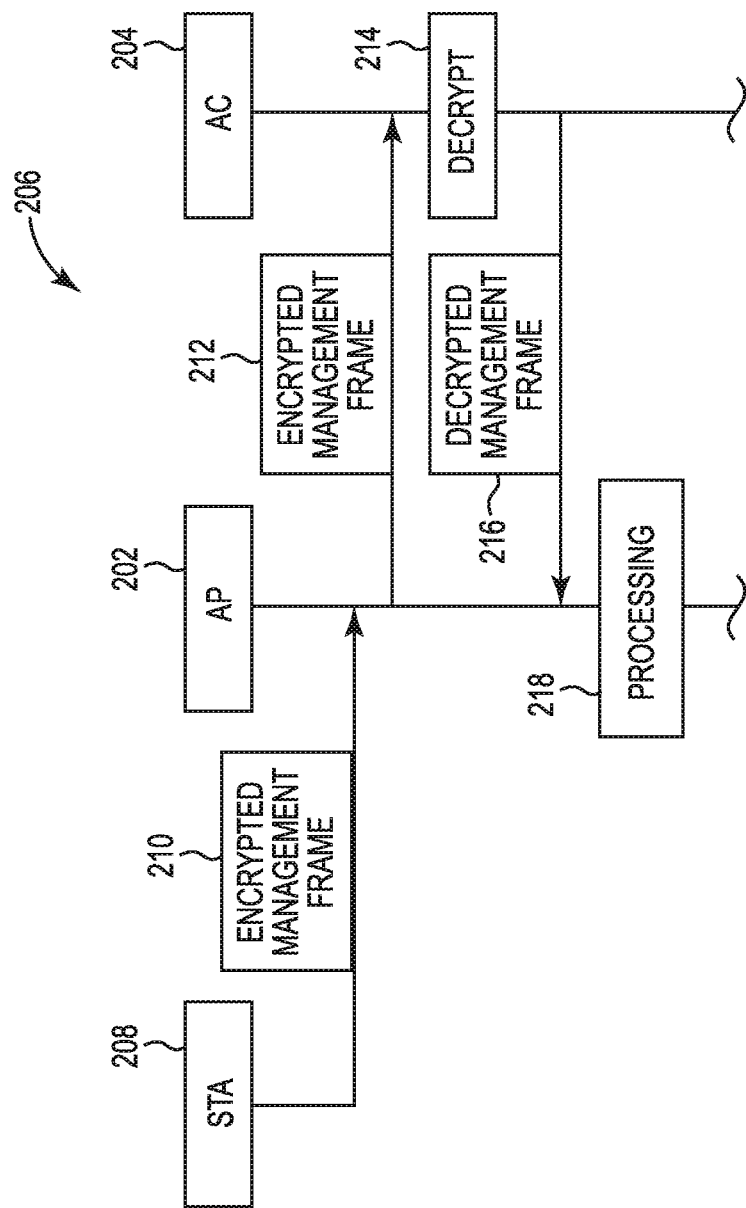
FIG. 2 is another example system for management frame encryption and decryption consistent with the present disclosure.

FIG. 2 is another example system 206 for management frame encryption and decryption consistent with the present disclosure. System 206 includes STA 208 associated with AP 202 and AC 204 associated with AP 202. In the example illustrated in FIG. 2, AP 202 receives an encrypted management frame at 212 from STA 208. The encrypted management frame is relayed to AC 204 at 212 where the management frame is decrypted at 214 and sent back to AP 202 by AC 204 at 216. At 218, AP 202 processes the decrypted frame. Processing, for instance, can include processing state information associated with the decrypted management frame. Processing state information can include storing the state information and generating a response management frame in response to receipt of the decrypted management frame from AC 204. In the example illustrated in FIG. 2, no response management frame is sent from AP 202 to STA 208. In some examples, communication between AP 202 and AC 204, including communication of unencrypted management frames, can occur via a secure tunnel.

Figure 3:
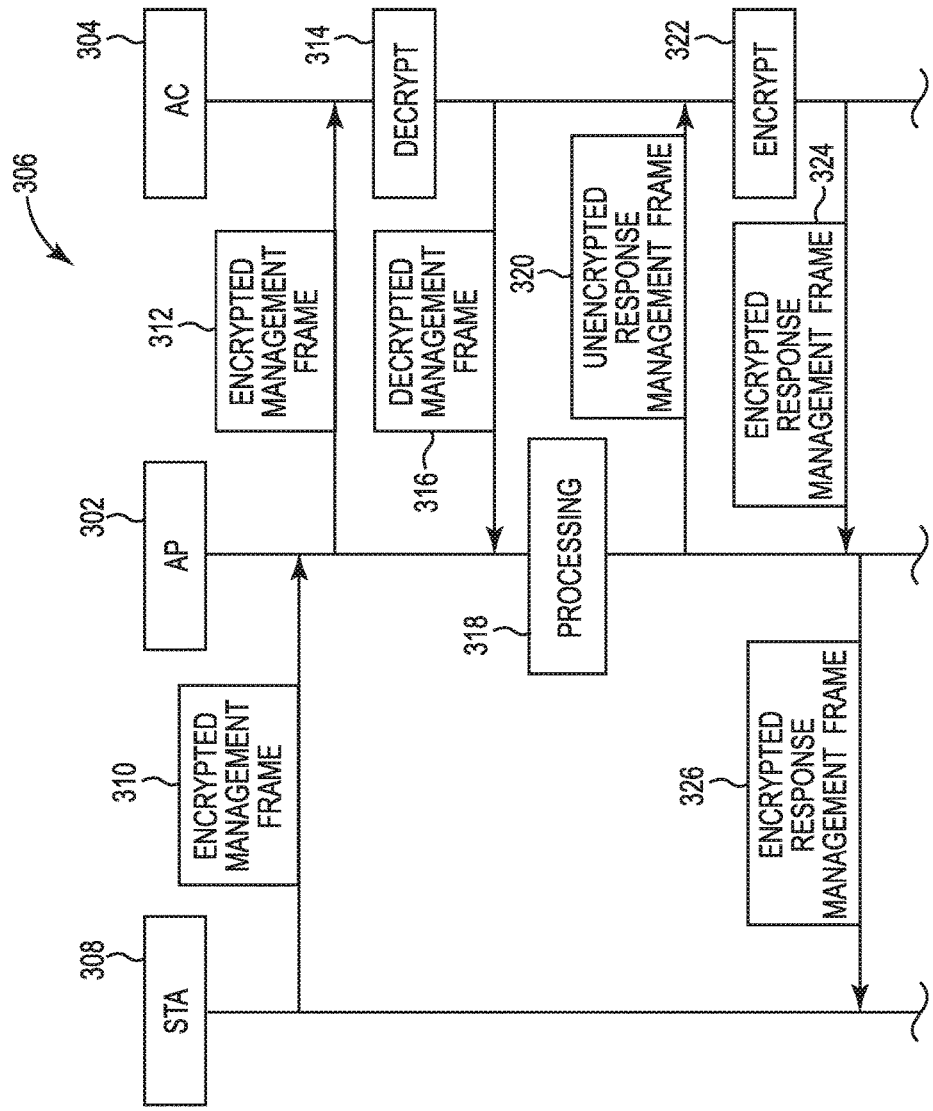
FIG. 3 is another example system for management frame encryption and decryption consistent with the present disclosure.

FIG. 3 is another example system 306 for management frame encryption and decryption consistent with the present disclosure. System 306 illustrates an example where AP 302 receives an encrypted management frame from STA 308 and returns an encrypted frame in response. In some examples, the encrypted management frame can be a protected management frame.

System 306 includes STA 308 associated with AP 302 and AC 304 associated with AP 302. For example, AP 302 receives an encrypted management frame at 312 from STA 308. The encrypted management frame is relayed to AC 304 at 312 where the management frame is decrypted at 314 and sent back to AP 302 at 316. AC 304 can store an encryption key in some examples for decryption of the encrypted management frame. At 318, AP 302 processes the decrypted frame and constructs a response management frame which is sent at 320 to AC 304 for encryption at 322. The encrypted response management frame is sent back to AP 302 at 324, and AP 302 sends the encrypted response management frame back to STA 308. In some examples, communication between AP 302 and AC 304, including communication of unencrypted management frames and unencrypted response management frames, can occur via a secure tunnel.

Figure 4:
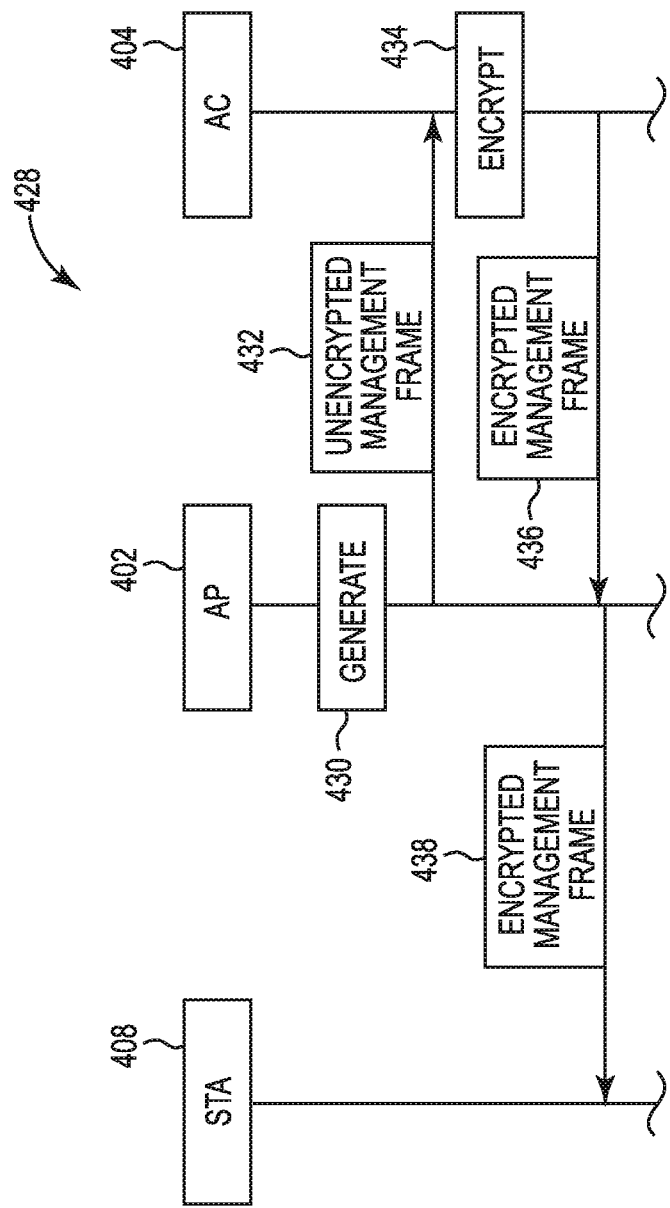
FIG. 4 is another example system for management frame encryption and decryption consistent with the present disclosure.

FIG. 4 is another example system 428 for management frame encryption and decryption consistent with the present disclosure. System 428 includes STA 408 associated with AP 402 and AC 404 associated with AP 402. At 430, AP 402 generates a management frame that is sent at 432 to AC 404 where it is encrypted at 434. The encrypted management frame is sent back to AP 402 at 436, and AP 402 sends the encrypted management frame to STA 408 at 438. In the example illustrated in FIG. 4, no response management frame is sent from STA 408. In some examples, communication between AP 402 and AC 404, including communication of unencrypted management frames, can occur via a secure tunnel.

Figure 5:
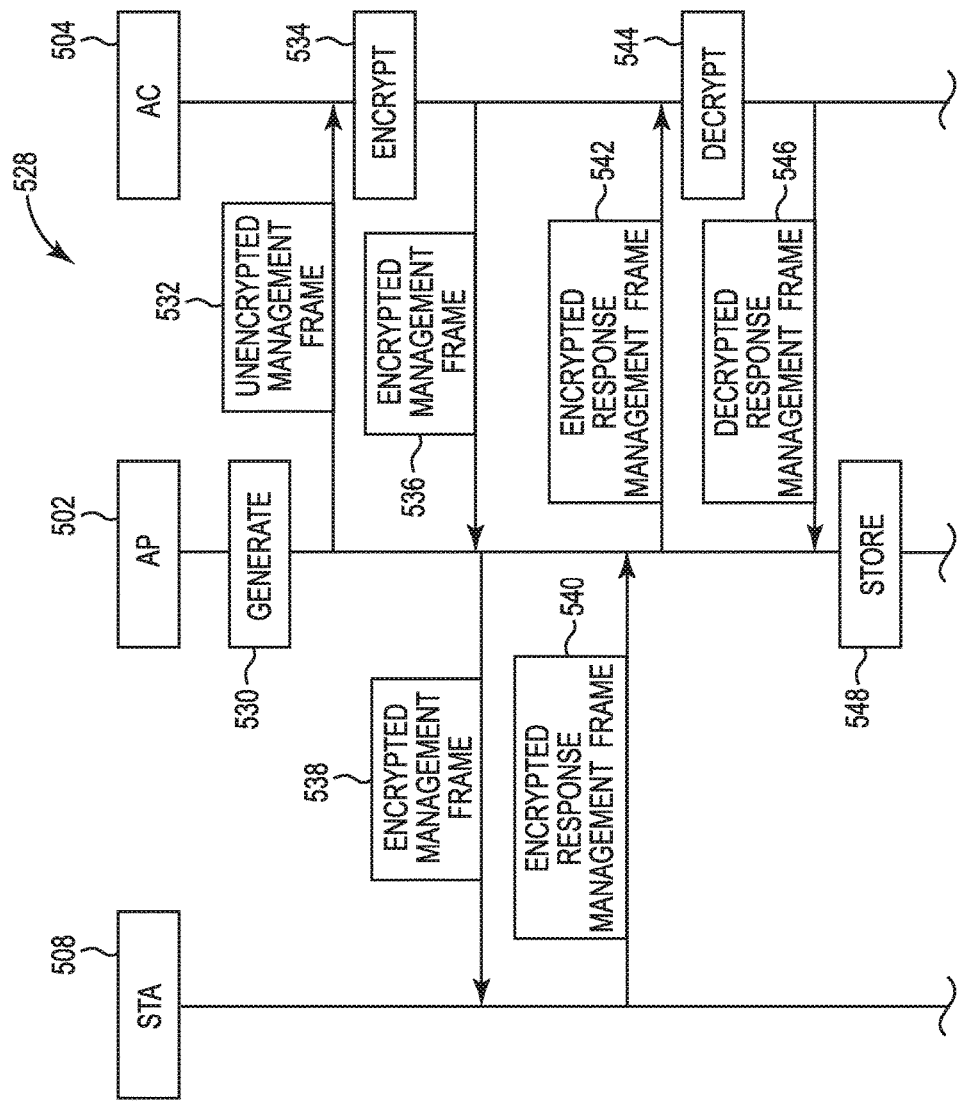
FIG. 5 is another example system for management frame encryption and decryption consistent with the present disclosure.

FIG. 5 is another example system 528 for management frame encryption and decryption consistent with the present disclosure. System 528 illustrates an example in which AP 502 sends an encrypted management frame to STA 508 and receives an encrypted management frame in response. For instance, system 528 includes STA 508 associated with AP 502 and AC 504 associated with AP 502. AP 402 generates a management frame at 530 that is sent at 532 to AC 504 where it is encrypted at 534. The encrypted management frame is sent back to AP 502 at 536, and AP 502 sends the encrypted management frame to STA 508 at 538. STA 508, in response, sends an encrypted response management frame at 540 to AP 502. The encrypted response management frame is relayed at 542 to AC 504 where the encrypted response management frame is decrypted at 544 and sent back to AP 502 at 546. At 548, state information of the decrypted response management frame and/or of STA 508 is stored on AP 502. In some examples, communication between AP 402 and AC 404, including communication of unencrypted management frames and unencrypted response management frames, can occur via a secure tunnel.

Figure 6:
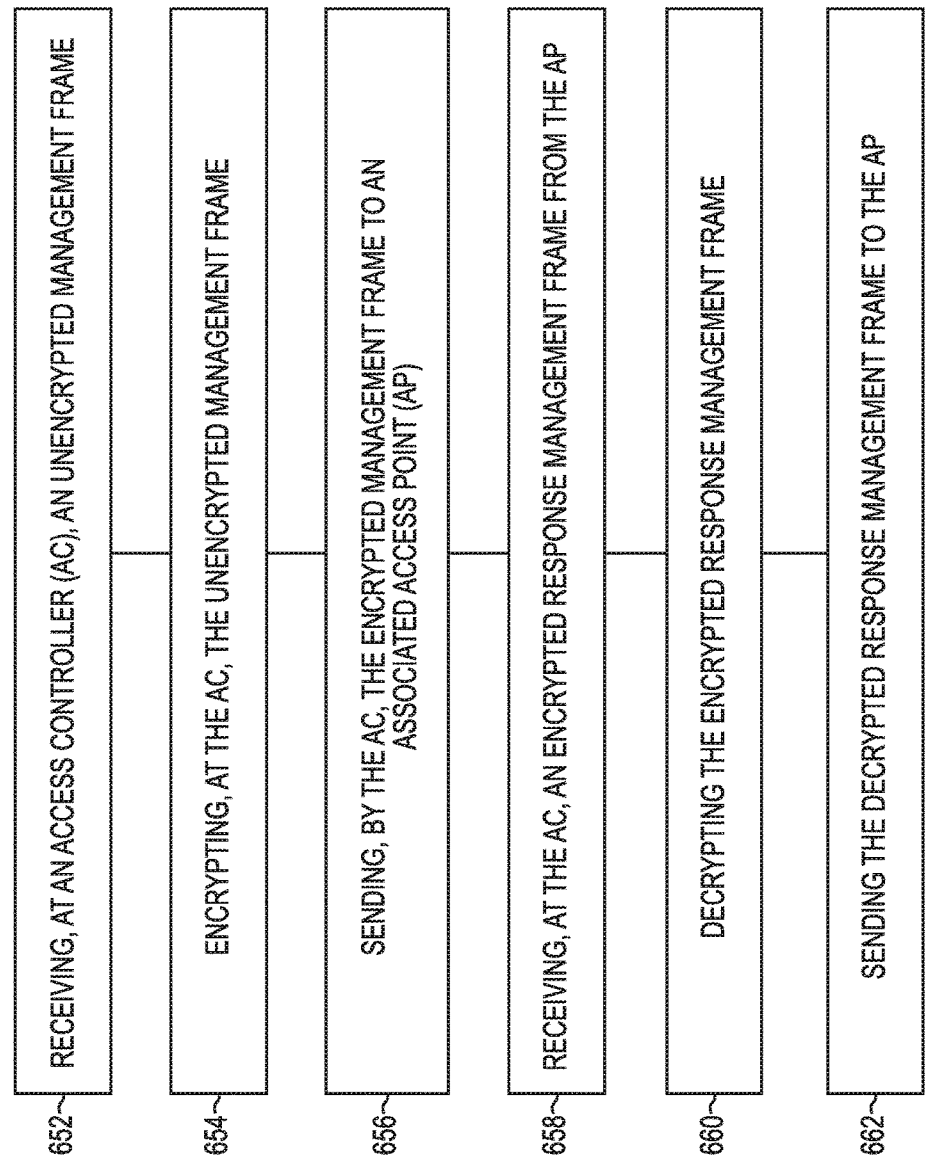
FIG. 6 is an example method for management frame encryption and decryption consistent with the present disclosure.

FIG. 6 is an example method 650 for management frame encryption and decryption consistent with the present disclosure. Similar to FIGS. 4 and 5, FIG. 6 illustrates an example method 650 in which an encrypted management frame, such as a protected management frame is sent to an STA from an AP.

At 652, method 650 can include receiving, at an AC, an unencrypted management frame. For instance, an associated AP can send the unencrypted management frame to the AC in a tunnel forwarding mode. For instance, the AP can generate a request for an encrypted management frame from the AC. At 654, the AC encrypts the management frame using an encryption key, and the AP can receive an encrypted management frame from the AC. At 656, method 650 can include the AC sending the encrypted management frame to the AP in a tunnel forwarding mode, and the AP can send the encrypted management frame to an STA associated with the AP in a tunnel forwarding mode.

In some examples, the AC can receive the encrypted response management frame from the AP responsive to a STA associated with the AP sending the encrypted response management frame to the AP. The AP can receive the encrypted response management frame from the STA responsive to the STA receiving the encrypted management frame from the AP. The encrypted response management frame can be sent by the AP to the AC for decryption. For instance, at 658, method 650 can include receiving, at the AC, an encrypted response management frame from the AP. The encrypted response management frame can be received by the AC responsive to the AP generating a request for the encrypted management data frame from the AC. In some instances, the request can be for a protected management frame from the AC.

Using an encryption key, at 660, method 650 can include decrypting the encrypted response management frame. Method 650, at 662, can include sending the decrypted response management frame to the AP. In response, the AP can store state information associated with the decrypted response management frame.

Some examples of the present disclosure can be more secure as compared to other approaches because encryption keys are neither sent to nor stored on APs. By doing so, a tunnel forwarding mode, which supports a centralized crypto architecture (e.g., where encryption and decryption occur at the AC) can be utilized.

In the foregoing detail description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to any number of such elements and/or features.

What is claimed:

1. An access controller (AC) to:
   receive an encrypted management frame from an access point (AP) associated with the AC;
   decrypt the encrypted management frame;
   send the decrypted management frame to the AP;
   receive an unencrypted response management frame from the AP;
   encrypt the unencrypted response management frame;
   send the encrypted response management frame to the AP.

2. The AC of claim 1, further comprising the AC to store an encryption key for decryption of the encrypted management frame.

3. The AC of claim 1, wherein the AC utilizes a tunnel forwarding mode to send the decrypted management frame to the AP.

4. The AC of claim 1, wherein the AC utilizes a tunnel forwarding mode to send the encrypted response management frame to the AP.

5. The AC of claim 1, further comprising the AC to store an encryption key for encryption of the unencrypted response management frame.

6. The AC of claim 1, wherein the AC is to receive the encrypted management frame from the AP responsive to the AP receiving the encrypted management from a station associated with the AP.

7. A system, comprising:
   an access controller (AC) associated with an access point (AP) to:
      decrypt an encrypted management frame received from the AP;
      send the decrypted management frame to the AP; and
      responsive to the AP processing state information associated with the decrypted management frame:
         receive an unencrypted response management frame from the AP;
         encrypt the unencrypted response management frame; and
         send the encrypted response management frame to the AP; and
   the AP to send the encrypted response management frame to a station associated with the AP.

8. The system of claim 7, further comprising the station associated with the AP to send the encrypted management frame to the AP.

9. The system of claim 7, wherein the AP to process state information comprises the AP to:
   store the state information; and
   generate a response management frame in response to receipt of the decrypted management frame from the AC.

10. The system of claim 7, further comprising the AP to generate a management frame based on state information associated with the station associated with the AP.

11. The system of claim 7, further comprising a station associated with the AP, wherein the station is to:
    send the encrypted management frame to the AP; and
    receive the encrypted response management frame from the AP.

12. The system of claim 7, wherein the encrypted management frame is a protected management frame.

13. The system of claim 7, further comprising the AC storing an encryption key for decryption of the encrypted management frame.

14. The system of claim 7, further comprising the AP to store a pre-encrypted management frame.

15. A method, comprising:
    receiving, at an access controller (AC), an unencrypted management frame;
    encrypting, at the AC, the unencrypted management frame;
    sending, by the AC, the encrypted management frame to an associated access point (AP);
    receiving, at the AC, an encrypted response management frame from the AP;
    decrypting, by the AC, the encrypted response management frame to generate a decrypted response management frame; and
    sending, by the AC, the decrypted response management frame to the AP.

16. The method of claim 15, further comprising receiving, at the AC, the encrypted response management frame from the AP responsive to a station associated with the AP sending the encrypted response management frame to the AP.

17. The method of claim 15, further comprising sending, by the AC, the encrypted management frame and the decrypted management response frame in a tunnel forwarding mode.

18. The method of claim 15, further comprising receiving, by the AC, the encrypted response management frame from the AP responsive to the AP generating a request for the encrypted management frame from the AC.

19. The method of claim 15, further comprising receiving, by the AC, the encrypted response management frame from the AP responsive to the AP generating a request for a protected management frame from the AC.

* * * * *